United States Patent
Schmitt et al.

(10) Patent No.: US 6,689,015 B2
(45) Date of Patent: Feb. 10, 2004

(54) METHOD FOR INFLUENCING THE PROPULSION OF A MOTOR VEHICLE THAT IS DRIVEN BY A DRIVING MOTOR

(75) Inventors: Johannes Schmitt, Markgröningen (DE); Tobias Weiss, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 09/890,079

(22) PCT Filed: Dec. 4, 2000

(86) PCT No.: PCT/EP00/12162
§ 371 (c)(1),
(2), (4) Date: Nov. 2, 2001

(87) PCT Pub. No.: WO01/40010
PCT Pub. Date: Jun. 7, 2001

(65) Prior Publication Data
US 2002/0125054 A1 Sep. 12, 2002

(30) Foreign Application Priority Data
Oct. 3, 1999 (DE) .......................................... 199 58 391

(51) Int. Cl.$^7$ ............................................. B60K 28/16
(52) U.S. Cl. ..................... 477/110; 180/197; 701/84; 701/85; 701/86
(58) Field of Search ................. 477/110, 111; 180/197; 701/84, 85, 86, 90

(56) References Cited

U.S. PATENT DOCUMENTS

| | | | |
|---|---|---|---|
| 4,933,856 A | | 6/1990 | Leiber ........................ 180/197 |
| 5,181,175 A | * | 1/1993 | Shiraishi et al. ............... 701/90 |
| 5,732,380 A | * | 3/1998 | Iwata ........................... 701/85 |
| 6,379,281 B1 | * | 4/2002 | Collins et al. ................. 477/110 |
| 6,463,379 B1 | * | 10/2002 | Kohler et al. .................. 701/84 |

FOREIGN PATENT DOCUMENTS

| | | |
|---|---|---|
| DE | 195 40 067 | 4/1997 |
| DE | 198 44 912 | 4/2000 |
| DE | 199 13 825 | 9/2000 |
| EP | 1 070 623 | 1/2001 |

OTHER PUBLICATIONS

SAE Paper 870 337, "ASR Traction Control—A Logical Extension of ABS".
"FDR—The Bosch Vehicle Dynamics Control System", Automobiltechnische Zeitschrift (ATZ) 96, 1994, vol. 11, pp. 674–689**.

* cited by examiner

Primary Examiner—Sherry Estremsky
(74) Attorney, Agent, or Firm—Kenyon & Kenyon (57) ABSTRACT

Method for influencing the propulsive power of a motor vehicle driven by a drive motor. An intervention variable, influencing the torque of the drive motor, is ascertained as a function of the wheel behavior of at least one wheel of the motor vehicle, and/or as a function of the motion of the motor vehicle. The drive motor is acted upon with the intervention variable to limit the propulsive power of the motor vehicle. An easily manipulated, safe, and reliable capability for automatically detecting situations in which the driver desires a greater propulsive power and making a greater propulsive power available in those situations, a motor vehicle with a slip control system is created. Evaluating a pedal variable that describes the actuation of an accelerator pedal of the motor vehicle, or a limitation variable that describes the number of limitations of driver stipulations resulting from the ascertaining of the intervention variable within a definable time window. Correcting the intervention variable, as a function of the pedal variable or the limitation variable, toward a corresponding greater propulsive power.

23 Claims, 4 Drawing Sheets

METHOD FOR INFLUENCING THE PROPULSION OF A MOTOR VEHICLE THAT IS DRIVEN BY A DRIVING MOTOR

FIELD OF THE INVENTION

The present invention relates to a method for influencing the propulsive power of a motor vehicle driven by a drive motor.

BACKGROUND INFORMATION

Methods and apparatuses for influencing the propulsive power of a motor vehicle are described in the existing art.

German Patent No. 195 40 067 A1 discusses a method for controlling the driving of multiple separately driven vehicle wheels of a motor vehicle. Upon the occurrence of drive slip at one of the drive wheels of the motor vehicle, the traction torque absent as a result of slip is transferred, up to a certain proportion, to the other drive wheel or wheels. This ensures that excessive drive torque is not transferred to the drive wheel that is still gripping, since this would create increased drive slip at that wheel as well. In particular, the drive slip of the drive wheel that is still gripping better is regulated to a drive slip setpoint that is set to a minimum setpoint which still ensures sufficient traction in every case.

In order to allow driving with an increased drive slip in specific situations, in such situations the drive slip setpoint is continuously elevated. To detect these situations, the position of an accelerator pedal of the motor vehicle is evaluated. If, in a situation with an increased tendency toward drive slip, the driver does not let off on the accelerator pedal but rather maintains its position or even presses it even further, this is interpreted as a desire to establish a greater drive slip at the drive wheels. The drive slip setpoints can be defined uniformly for all drive wheels, or for individual wheels.

With the known method, the drive slip of a drive wheel of the motor vehicle is employed as the wheel variable. A drive slip setpoint is ascertained, as the intervention variable, for one or more drive wheels of the motor vehicle.

A further example that may be cited of a method and an apparatus for influencing the propulsive power of a motor vehicle is SAE Paper 870 337, "ASR Traction Control—A Logical Extension of ABS." With a drive slip control system of this kind (abbreviated ASR), the propulsive power of a motor vehicle is adjusted as a function of the wheel slip ascertained for the drive wheels. The propulsive power is adjusted in such a way that the slip of the driven wheels does not exceed a threshold value defined for the drive wheels. The result of this measure is to ensure, in the drive context, stability of the vehicle as well as sufficient traction.

The article "FDR—The Bosch vehicle dynamics control system" [FDR—Die Fahrdynamikregelung von Bosch], published in Automobiltechnische Zeitschrift (ATZ) 96, 1994, Vol. 11, pages 674–689, discloses a slip control system in which the yaw rate of the motor vehicle is controlled. For this purpose, the deviation between a setpoint for the yaw rate and a measured value for the yaw rate is ascertained. As a function of this system deviation, reference slip values are ascertained and are established with the aid of braking interventions and engine interventions. This type of slip control system has a higher-level controller for the yaw rate, and lower-level controllers for a brake slip and a drive slip.

In addition to conventional drive slip control as described in SAE Paper 870 337, in which the wheel slip occurring at the drive wheels is compared to threshold values, there is known from German Patent No. 199 13 825 a method for adjusting the propulsive power in which an intervention variable is ascertained on the basis of characteristics diagrams. Provision is made for two characteristics diagrams. With a first characteristics diagram, a first value for the intervention variable is created as a function of a gradient of the slip and a reference speed of the motor vehicle. With a second characteristics diagram, a second value for the intervention variable is created as a function of a slip and the reference speed of the motor vehicle. The intervention variable itself is then derived from the two values, for example by addition. The propulsive power of the motor vehicle is adjusted as a function of the intervention value.

Also known, from German Patent No. 198 44 912, is an apparatus with which an intervention variable is ascertained as a function of a transverse acceleration variable and a variable that describes the behavior over time of the transverse acceleration variable. The intervention variable is ascertained on the basis of two characteristics diagrams: a first characteristics diagram for the transverse acceleration, and a second characteristics diagram for the variable that describes the behavior over time of the transverse acceleration. To influence the propulsive power, interventions are performed on the drive motor of the motor vehicle as a function of the intervention variable. In the context of the methods and apparatuses discussed above for influencing the propulsive power of a motor vehicle, there are situations with regard to drive slip in which a greater propulsive power or elevated drive slip is desired.

One example that may be cited as a situation in which a greater propulsive power is desired is driving on an unconsolidated surface, for example on gravel or in deep snow, or operating the motor vehicle with snow chains, or off-road driving. When driving in deep snow, it may happen that the wheels of the motor vehicle "dig in" and the vehicle comes to a stop. When the driver then attempts to start from rest in such a situation, this will not be possible. Since the wheels have dug into the deep snow, they exhibit a great deal of drive slip when attempting to start from rest. An ASR detects the slip and brakes the driven wheels. The driver thus cannot generate sufficient propulsive power to allow him or her to drive the motor vehicle out of its "dug-in" position.

For this reason, it is known in the context of ASR systems to arrange on the instrument panel a switch that can be actuated by the driver. Actuation of the switch raises the slip thresholds of the ASR system. The result is that when the switch is pressed, an increased propulsive power can be established. This therefore makes it possible for the driver of a motor vehicle that is "dug in" in deep snow to drive the vehicle back out of the deep snow by "rocking" it free.

A further situation in which greater propulsive power of the motor vehicle is desirable is, for example, a sporty driving style. As a result of the interventions of a slip control system or an apparatus such as the one known from German Patent No. 198 44 912, a sporty driver can feel too limited. The slip control system or the aforementioned apparatus does ensure sufficient lateral stability for the vehicle in curves, but the result is that a driver cannot negotiate a curve with the desired propulsive power that he or she has selected, since because the intervention variable is prepared as a function of the transverse acceleration and the change over time in the transverse acceleration, the intervention variable—and with it the propulsive power as well—is limited. The limitation is applied in such a way that in the context of the existing transverse acceleration and the change over time in the transverse acceleration, and allowing for a certain safety factor, the driving behavior of the motor vehicle is stable with a very high probability. For a sporty driver, however, this can constitute a limitation.

The utilization, known from the existing art, of a switch to lower the drive slip thresholds also entails safety risks. If the driver forgets to release the switch again, and if the motor vehicle is no longer in one of the situations described (e.g. in deep snow), then in other situations in which assistance by a slip control system (e.g. a drive slip control system or yaw rate control system) would be necessary, the stabilization of vehicle dynamics is absent or insufficient.

It is therefore an object of the present invention, in the context of a motor vehicle with a slip control system, to create an easily manipulated, safe, and reliable capability for automatically detecting situations in which the driver desires a greater propulsive power and making a greater propulsive power available in those situations.

SUMMARY OF THE INVENTION

To achieve this object, the invention proposes, proceeding from the method of the kind cited initially for influencing the propulsive power of a motor vehicle:

- to ascertain a pedal variable that describes the actuation of an accelerator pedal of the motor vehicle;
- to compare a propulsive power corresponding to the pedal variable to a propulsive power corresponding to the intervention variable;
- to correct the intervention variable, as a function of the pedal variable, toward a corresponding greater propulsive power, if the propulsive power corresponding to the pedal variable is greater than the propulsive power corresponding to the intervention variable;
- a correction variable being ascertained, for correction of the intervention variable, as a function of the pedal variable and the rotation speed of the drive motor, and added to the intervention variable; and
- to act upon the drive motor with the corrected intervention variable.

In the method, an intervention variable influencing the torque of the drive motor is ascertained. The intervention variable is ascertained as a function of at least one wheel variable that describes the wheel behavior of at least one wheel of the motor vehicle, and/or as a function of at least one vehicle motion variable that describes the motion of the motor vehicle. To influence in limiting fashion the propulsive power of the motor vehicle, the drive motor is acted upon with the intervention variable.

The invention furthermore relates to a control unit for an apparatus for influencing the propulsive power of a motor vehicle driven by a drive motor. The control device has means for determining at least one wheel variable that describes the wheel behavior of at least one wheel of the motor vehicle. Alternatively or additionally, the control device has means for determining at least one vehicle motion variable that describes the motion of the motor vehicle. The control device furthermore has means for determining an intervention variable influencing the torque of the drive motor. The intervention variable is determined as a function of the at least one wheel variable and/or the at least one vehicle motion variable. To influence in limiting fashion the propulsive power of the motor vehicle, the drive motor is acted upon with the intervention variable.

The present invention moreover relates to a memory element for a control device of an apparatus for influencing the propulsive power of a motor vehicle. The memory element is configured in particular as a read-only memory, as a random access memory, or as a flash memory. A computer program that is executable on a computing device, in particular on a microprocessor, is stored on the memory element. Lastly, the invention also concerns such a computer program.

In order to recognize situations in which the driver desires a greater propulsive power, a pedal variable that describes the actuation of the accelerator pedal by the driver is ascertained. The pedal variable is a measure of how much propulsive power the driver desires. A large pedal variable can be evaluated as an indication that the driver desires a greater propulsive power. In the case in which the pedal variable corresponds to a greater propulsive power than that established on the basis of the engine interventions performed as a function of the intervention variable, the intervention variable is modified, at least as a function of the pedal variable, in such a way that a greater propulsive power is established.

For the case in which the pedal variable corresponds to a greater propulsive power than that established based on the engine interventions performed as a function of the intervention variable, the intervention variable is to be modified in such a way that a greater propulsive power is established. The modification of the intervention variable is achieved as follows: first, a characteristics diagram for which the pedal variable and a variable describing the rotation speed of the engine constitute input variables is evaluated; next, a correction variable is obtained as a function of the characteristics diagram and is added to the intervention variable; and this yields a corrected (and thus greater) intervention variable that results in a greater propulsive power. This greater propulsive power is correlated with the driver's desire, which can be deduced from his or her actuation of the accelerator pedal.

The characteristics diagram is advantageously constructed in such a way that the correction variable increases on the one hand with an increasing pedal variable, and on the other hand with decreasing engine speed. The correction variable assumes maximum values when the pedal variable is high and the engine speed is low. This dependence of the correction variable on the input variables of the characteristics diagram can be explained as follows: the propulsive power is to be increased as a function of the pedal variable; consequently, the correction variable must become greater as the pedal variable increases. The rotation speed of the drive motor is taken account because the engine should be corrected less strongly with increasing rotation speed so as not to endanger the stability of the motor vehicle. The correction variable must therefore decrease with increasing engine speed.

The present invention encompasses two different concepts. In a first concept, an intervention variable is ascertained as a function of at least one wheel variable that describes the wheel behavior, and engine interventions are performed as a function of that intervention variable to adjust the propulsive power of the vehicle. This concept can be, for example, a conventional drive slip control system such as the one described in the aforementioned SAE Paper 870 337. With this drive slip control system, the slip present at the driven wheels is compared to a corresponding threshold value. In this case, therefore, the wheel variable corresponds to the wheel slip.

Furthermore, the first concept can also be a slip control apparatus, for example as is known from Automobiltechnische Zeitschrift (ATZ) 96, loc. cit. In this case as well, the wheel variable corresponds to the wheel slip.

Alternatively, the first concept can also be based on the procedure that is described in German Patent No. 199 13

825. The content of that patent application is hereby to be incorporated into the Specification and to become part of the Specification. In this apparatus, on the one hand the wheel slip itself and on the other hand the change over time in (or gradient of) the wheel slip are used as the wheel variable.

If the basis of the first concept is the procedure described in German Patent No. 199 13 825, then advantageously the pedal travel over which the pedal is deflected as a result of actuation by the driver is sensed as the pedal variable. Alternatively, the angle of the pedal deflection can also be sensed. A corresponding pedal variable is also evaluated in the slip control systems that are described in the aforementioned SAE Paper, loc. cit. and the ATZ article, loc. cit. Lastly, a variable that describes the change over time in the pedal travel, i.e. the pedal travel gradient, can also be sensed as the pedal variable.

In the context of a second concept, an intervention variable is ascertained as a function of at least one vehicle motion variable that describes the vehicle motion, and engine interventions to adjust the propulsive power are performed as a function of that intervention variable. A concept of this kind is described, for example, in German Patent No. 198 44 912. The content of that patent application is hereby to be incorporated into the Specification and to become part of the Specification. This apparatus contains means with which a transverse acceleration variable, which describes the transverse acceleration acting on the vehicle, is sensed. The apparatus moreover contains means with which a variable that describes the behavior over time of the transverse acceleration variable is ascertained. As a function of the transverse acceleration variable and the variable that describes the behavior over time of the transverse acceleration variable, an intervention variable is ascertained using characteristics diagrams. Engine interventions are performed to influence the propulsive power, the engine interventions being performed as a function of the intervention variable.

In this concept, on the one hand the transverse acceleration variable itself and on the other hand its derivation over time are processed as vehicle motion variables. More precisely, the intervention variable is ascertained as a function of the transverse acceleration and the change over time in the transverse acceleration. With this concept, sufficient lateral stability of the vehicle in curves can be ensured.

For the second concept as well, the method according to the present invention provides for correcting the intervention variable as applicable, as a function of the pedal variable, toward a corresponding greater propulsive power. In this case the method according to the present invention corresponds to a driver type recognition system, with which the sporty driver is recognized and with which, upon recognition of a sporty driver, the propulsive power is correspondingly increased.

As is evident from the discussion above, a certain "learning" phase is initially necessary, in which the system determines the particular driver type on the basis of the variables that are present. As soon as it is apparent that the driver is a sporty one, a change in the intervention variable toward greater propulsive power is authorized.

According to an advantageous development of the present invention, it is proposed that before correction of the intervention variable, a check be made as to whether the pedal variable is greater than a definable first threshold value; and the intervention variable is not corrected if the pedal variable is less than or equal to the first threshold value.

Alternatively or additionally, according to another advantageous development of the present invention it is proposed that before correction of the intervention variable, a check be made as to whether a transverse acceleration of the motor vehicle is less than a definable second threshold value; and the intervention variable is not corrected if the transverse acceleration is greater than or equal to the second threshold value. Taking the transverse acceleration into account eliminates those instances in which the increase in propulsive power would result in an instability of the vehicle in the vehicle's transverse direction. In the case described above of "rocking" a motor vehicle loose when it has become stuck in deep snow, usually very little or no transverse acceleration occurs, since the vehicle cannot move laterally. Such a situation is recognized by the plausibility query and makes possible an increase in propulsive power.

These two developments thus include a plausibility check of the pedal variable and of the transverse acceleration of the motor vehicle. The intervention variable is corrected only if the pedal variable is equal to or greater than the first threshold value and/or the transverse acceleration is less than or equal to the second threshold value.

As a further way of achieving the object of the present invention, it is proposed, proceeding from the method of the kind cited initially:
 to ascertain a limitation variable that describes the number of limitations of driver stipulations resulting from the ascertaining of the intervention variable within a definable time window;
 to correct the intervention variable as a function of the limitation variable toward a corresponding greater propulsive power if the limitation variable exceeds a definable third threshold value; and
 to act upon the drive motor with the corrected intervention variable.

As an alternative to the evaluation of the pedal variable, it is also possible to evaluate how often the driver stipulations are limited. What is ascertained, therefore, is how often a lesser propulsive power than that which the driver would actually like to achieve is established as a result of ascertaining the intervention variable as a function of the wheel variable or the vehicle motion variable. This examination with regard to the frequency of limitation is advantageously made within a definable time window. In addition, it is an advantageous possibility to evaluate changes in the wheel rotation speeds in terms of the driver's acceleration behavior (in which case the non-driven wheels are considered) or in terms of his or her deceleration behavior (in which case the wheels without brake slip control are considered).

The nature of the intervention variable influencing the delivered torque depends on a variety of factors. On the one hand, for different drive motors it is possible also to use different intervention variables with which the torque delivered by the drive motor is influenced. For one and the same drive motor there may moreover be different intervention variables with which the torque delivered by the drive motor can be influenced.

According to an exemplary embodiment of the present invention, it is proposed that in the context of a drive motor configured as an internal combustion engine, a fuel quantity to be injected into an intake manifold or into a combustion chamber of the internal combustion engine be employed as the intervention variable influencing the delivered torque.

According to another exemplary embodiment of the present invention, it is proposed that in the context of a drive motor configured as an internal combustion engine, a point in time for the injection of fuel into an intake manifold or into a combustion chamber of the internal combustion engine be employed as the intervention variable influencing the delivered torque.

According to yet another exemplary embodiment of the present invention, it is proposed that in the context of a drive motor configured as an internal combustion engine, a point in time for ignition of a fuel-air mixture present in a combustion chamber of the internal combustion engine be employed as the intervention variable influencing the delivered torque.

It is furthermore proposed that in the context of a drive motor configured as an internal combustion engine, an angle of a throttle valve of the internal combustion engine be employed as the intervention variable influencing the delivered torque.

Lastly, it is proposed that in the context of a drive motor configured as an electric motor, a current or a voltage be employed as the intervention variable influencing the delivered torque.

As a further way of achieving the object of the present invention, it is proposed, proceeding from the control device of the kind cited initially, that means for carrying out the method according to the present invention be implemented in the control device.

Particularly significant is the implementation of the method according to the present invention in the form of a memory element that is provided for a control device of a vehicle dynamics control system of a motor vehicle. In this context, a computer program that is executable on a computing device, in particular on a microprocessor, and is suitable for carrying out the method according to the present invention, is stored on the memory element. In this case, therefore, the invention is realized by way of a computer program stored on the memory element, so that this memory element equipped with the computer program constitutes the invention in the same way as the method for whose performance the computer program is suitable. An electrical memory medium, for example a read-only memory, a random access memory, or a flash memory, can, in particular, be used as the memory element.

Lastly, the invention also concerns a computer program that is suitable for carrying out the method according to the present invention when it executes on a computing device, in particular on a microprocessor. In one exemplary embodiment the computer program is stored on a memory element, in particular on a flash memory.

DETAILED DESCRIPTION

Regarding the description of FIG. 1, what will be discussed first is a drive slip control system of a motor vehicle like that described in SAE Paper 870 337. In this reference, an intervention variable E influencing torque M of a drive motor 2 of the motor vehicle is ascertained as a function of a wheel variable R. A slip of a drive wheel of the motor vehicle is employed as wheel variable R. Intervention variable E is ascertained in a processing unit 1 as a function of a deviation between the ascertained wheel slip R and an associated threshold value R_schw. Intervention variable E corresponds to or describes the propulsive power that is to be established. When drive motor 2 of the motor vehicle is acted upon with intervention variable E ascertained on the basis of the drive slip control system, the motor vehicle can start from rest or accelerate without spinning its wheels.

In the context of a drive motor 2 configured as a diesel engine, intervention variable E is the fuel quantity to be injected. In the context of internal combustion engines in general, an injection time, an ignition time (so-called ignition angle), or a throttle valve angle can be employed as intervention variable E.

Figure 1:
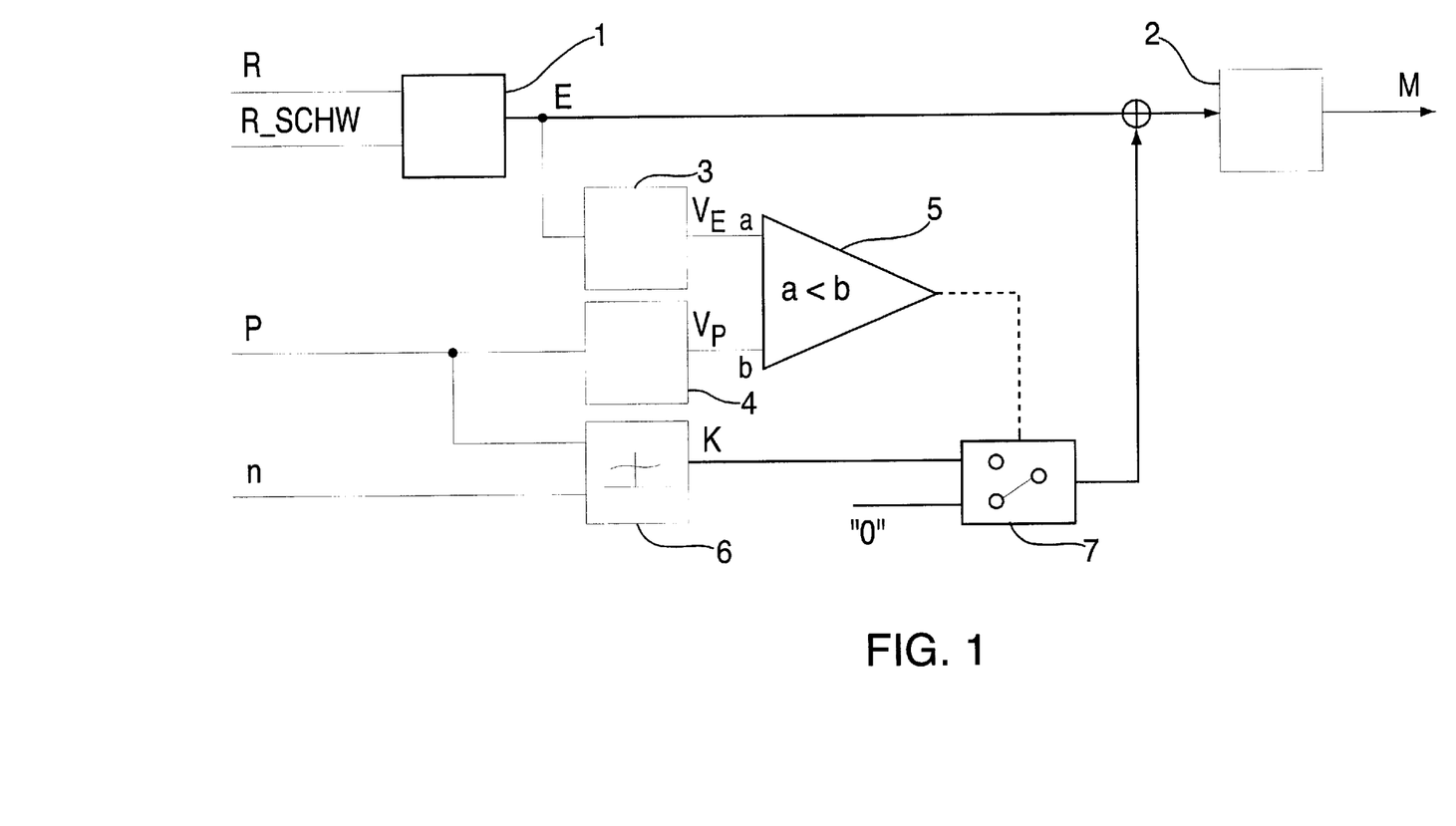
FIG. 1 shows a first embodiment of a method according to the present invention.

With the method depicted in FIG. 1, it is possible to recognize automatically a situation in which the driver of the motor vehicle desires a higher propulsive power. For that purpose, a pedal variable P is analyzed. Pedal variable P can be the travel of an accelerator pedal or the gradient of the accelerator pedal travel. In addition, the duration or intensity of the accelerator pedal actuation can also be incorporated into pedal variable P. A propulsive power V_E corresponding to intervention variable E is calculated in a processing unit 3. A propulsive power V_P corresponding to pedal variable P is similarly determined in a processing unit 4. In a comparison unit 5, a comparison is made between propulsive power V_E that has been set and the desired propulsive power V_P. If propulsive power V_P corresponding to pedal variable P is greater than propulsive power V_E corresponding to intervention variable E, intervention variable E is corrected, as a function of pedal variable P, toward a corresponding greater propulsive power.

Figure 4:
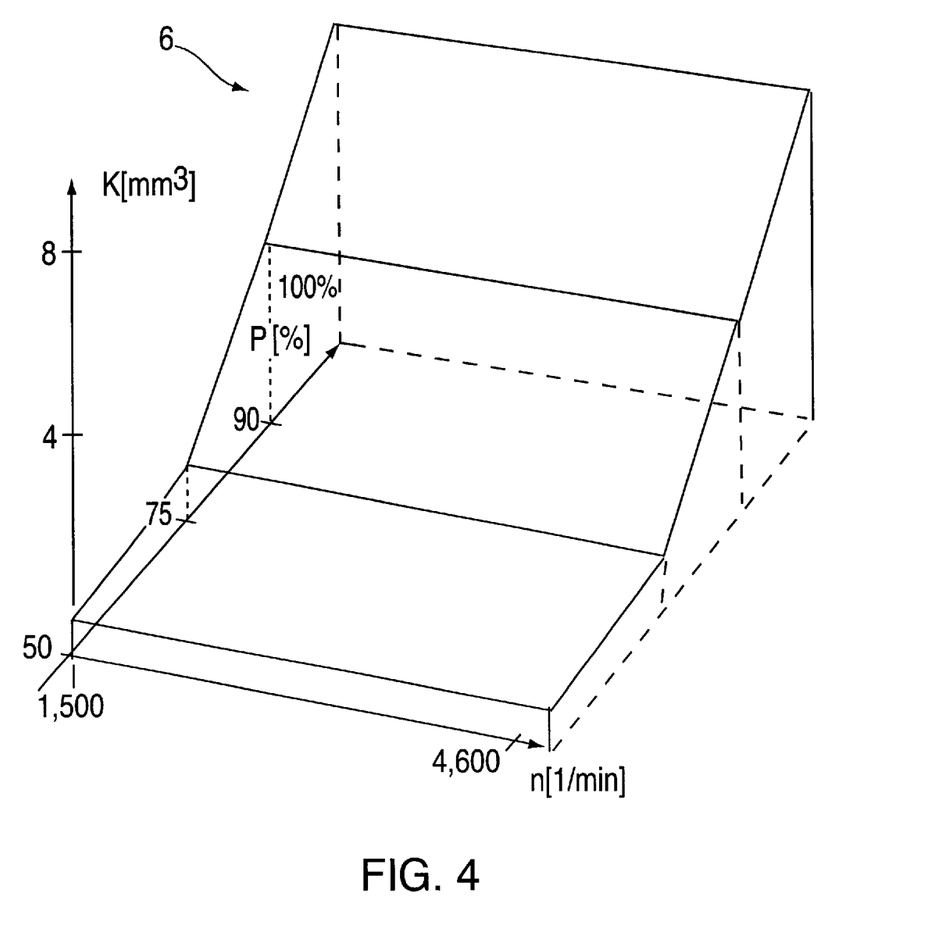
FIG. 4 shows a characteristics diagram for ascertaining a correction variable for correction, according to the present invention, of a torque-influencing intervention variable.

In order to correct intervention variable E, a correction variable K is ascertained and is added to intervention variable E. Correction variable K is ascertained on the basis of a characteristics diagram 6 as a function of rotation speed n of drive motor 2 and pedal variable P. A corresponding characteristics diagram 6 is depicted in FIG. 4. Correction value K is present at one input of a switching unit 7. The value "0" is present at the other input. Switching unit 7 is actuated by an output signal of comparison unit 5. If propulsive power V_E is greater than or equal to propulsive power V_P, switching unit 7 does not switch, and the value "0" is added to intervention variable E. Otherwise switching unit 7 does switch, and correction variable K is added to intervention variable E. Drive motor 2 is acted upon with the sum of intervention variable E and correction variable K, thereby achieving a greater propulsive power for the motor vehicle.

In the context of a slip control system such as that described in the ATZ article cited above, intervention variable E is ascertained as a function of the deviation between wheel slip R ascertained for a wheel and the wheel slip setpoint existing for that wheel.

Figure 2:
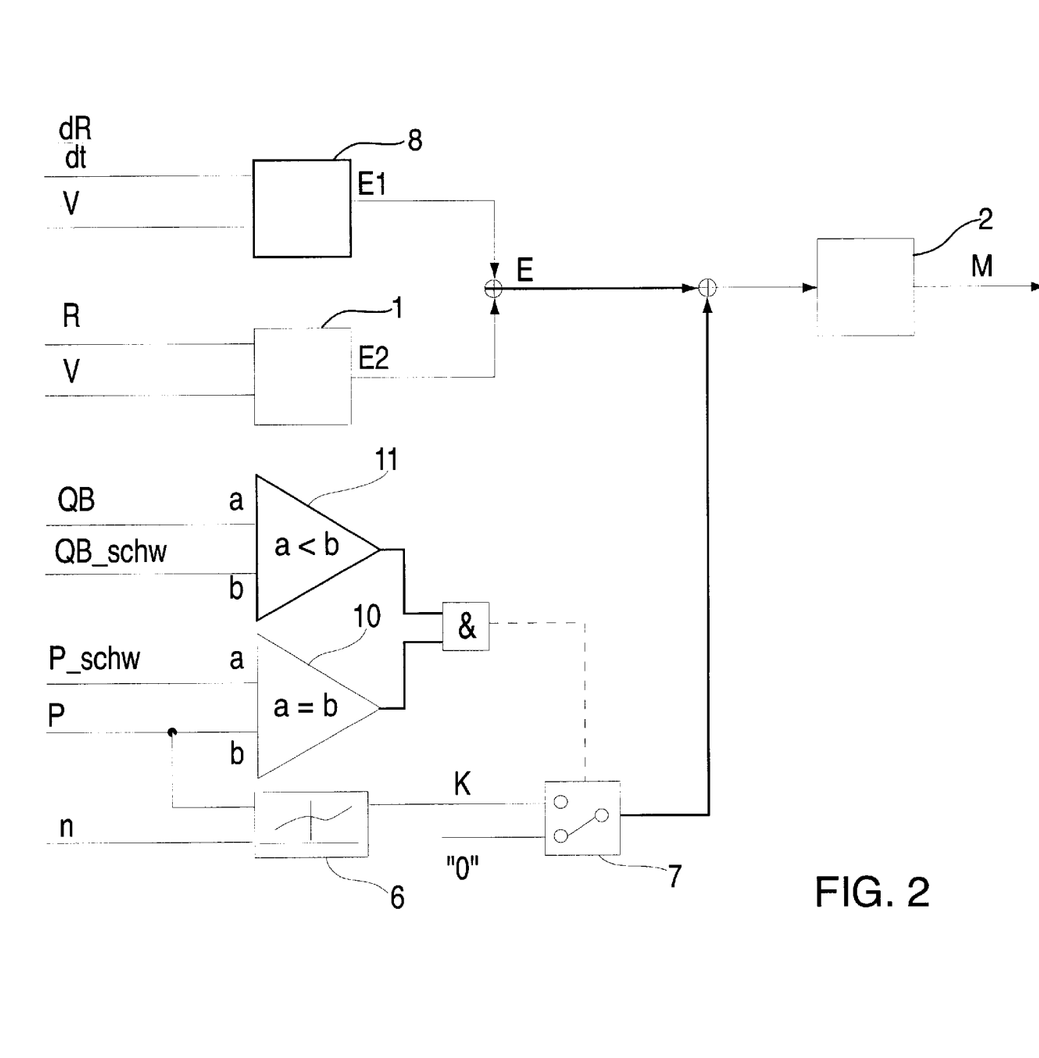
FIG. 2 shows a second exemplary embodiment of a method according to the present invention.

A further exemplary embodiment of the method according to the present invention will be described below with reference to FIG. 2. In the context of an apparatus for influencing the propulsive power of a motor vehicle as described in German Patent No. 199 13 825, firstly a first value E1 for intervention variable E is ascertained in a first processing unit 8 as a function of the change over time in wheel slip R and speed V of the vehicle. A second value E2 for intervention variable E is ascertained in a second processing unit 9 as a function of wheel slip R and vehicle speed V. First value E1 and second value E2 are added to intervention value E. If pedal variable P is greater than a corresponding threshold value P_schw (comparison unit 10), and if transverse acceleration QB acting on the vehicle is less than a corresponding threshold value QB_schw (comparison unit 11), a correction variable K for intervention variable E is ascertained. Correction variable K is ascertained, as already mentioned, with the aid of characteristics diagram 6.

Correction variable K is added to intervention variable E. This addition implements a traction assistance action. The propulsive power of the vehicle is adjusted as a function of intervention variable E corrected in this fashion. This propulsive power is greater than propulsive power V_E present before the traction assistance action.

In the context of a method for influencing the propulsive power of a vehicle as described in German Patent No. 198 44 912 (but not depicted in the Figures), intervention variable E is ascertained as a function of a transverse acceleration variable QB and a variable dQB/dt which describes the behavior over time of transverse acceleration QB. Intervention variable E is ascertained on the basis of two characteristics diagrams: a first characteristics diagram for transverse acceleration QB, and a second characteristics diagram for variable dQB/dt which describes the behavior over time of transverse acceleration QB. To influence the propulsive power, interventions are made in drive motor 2 of the motor vehicle as a function of intervention variable E.

Figure 3:
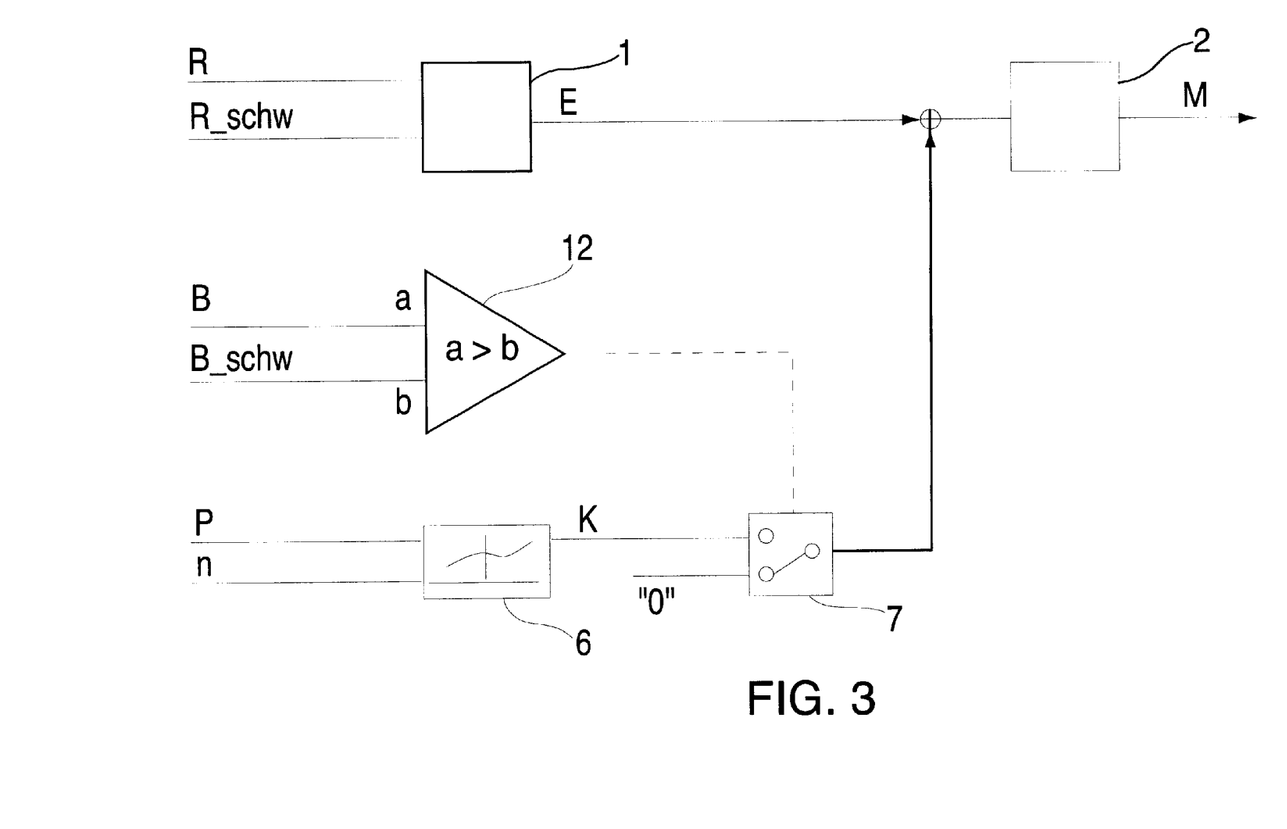
FIG. 3 shows a third exemplary embodiment of a method according to the present invention.

FIG. 3 depicts a further exemplary embodiment of the present invention. In this, a situation in which a greater propulsive power is desired by the driver of the motor vehicle is ascertained by evaluating a limitation variable B. Limitation variable B describes the number of limitations of driver stipulations resulting from the ascertaining of intervention variable E within a definable time window. If limitation variable B exceeds a definable threshold value B_schw, intervention variable E is corrected toward a corresponding greater propulsive power. The comparison is performed in a comparison unit 12. For correction, correction variable K ascertained by characteristics diagram 6 is added to intervention variable E. Drive motor 2 is acted upon with the corrected intervention variable, i.e. the sum of correction variable K and intervention variable E that was ascertained.

Once correction variable K has been ascertained, it is conceivable to perform a plausibility query (which is not, however, depicted in the Figures). For example, a check can be made as to whether transverse acceleration QB acting on the vehicle is less than a corresponding threshold value QB_schw, whether pedal variable P is greater than a corresponding threshold value P_schw, and whether rotation speed n of drive motor 2 is less than a corresponding threshold value n_schw. Correction variable K is added to intervention variable E only if all the plausibility queries are met.

FIG. 4 depicts the profile of characteristics diagram 6 for ascertaining correction variable K from pedal variable P and the rotation speed of drive motor 2. Characteristics diagram 6 is constructed in such a way that correction variable K increases on the one hand with increasing pedal variable P and on the other hand with decreasing engine speed n. Correction variable K assumes maximum values when pedal variable P is large and engine speed n is low. This dependence of correction variable K on input variables P, n of characteristics diagram 6 can be explained as follows: propulsive power is to be increased as a function of pedal variable p; consequently the correction variable must become greater with increasing pedal variable P. Rotation speed n of drive motor 2 is taken into account because motor 2 should be corrected less strongly with increasing rotation speed n so as not to endanger the stability of the motor vehicle.

What is considered in the present case is a diesel engine whose intervention variable E is the fuel quantity to be injected (in units of $mm^3$). Correction variable K thus also uses the unit of $mm^3$. In characteristics diagram 6 considered here, correction variable K ranges from 0 to 8 $mm^3$. Rotation speed n ranges from 1500 rpm to 4600 rpm. Pedal variable P ranges from 50% to 100%.

What is claimed is:

1. A method for influencing a propulsive power of a motor vehicle driven by a drive motor, comprising the steps of:

ascertaining an intervention variable as a function of at least one of at least one wheel variable that describes a wheel behavior of at least one wheel of the motor vehicle and at least one vehicle motion variable that describes a motion of the motor vehicle, the intervention variable influencing a torque of the drive motor, to limit the propulsive power of the motor vehicle;

ascertaining a pedal variable that describes an actuation of an accelerator pedal of the motor vehicle;

comparing a first propulsive power corresponding to the pedal variable to a second propulsive power corresponding to the intervention variable;

correcting the intervention variable as a function of the pedal variable toward a corresponding greater propulsive power if the first propulsive power is greater than the second propulsive power;

ascertaining a correction variable for correction of the intervention variable as a function of the pedal variable and a rotation speed of the drive motor, adding the correction variable to the intervention variable to calculate a corrected intervention variable; and acting upon the drive motor with the corrected intervention variable.

2. The method of claim 1, further comprising the step of:

before correction of the intervention variable, checking whether the pedal variable is greater than a definable first threshold value, wherein:
the intervention variable is not corrected if the pedal variable is one of less than and equal to the first threshold value.

3. The method of claim 1, further comprising the step of:

before correction of the intervention variable, checking whether a transverse acceleration of the motor vehicle is less than a definable second threshold value, wherein:
the intervention variable is not corrected if the transverse acceleration is one of greater than and equal to the second threshold value.

4. The method of claim 1, wherein the correction variable is ascertained on the basis of a characteristics diagram.

5. The method of claim 1, wherein:

the drive motor includes an internal combustion engine, and a fuel quantity to be injected into one of an intake manifold and a combustion chamber of the internal combustion engine is employed as the intervention variable to influence the torque.

6. The method of claim 1, wherein:

the drive motor includes an internal combustion engine; and a point in time for an injection of a fuel into one of an intake manifold and a combustion chamber of the internal combustion engine is employed as the intervention variable to influence the torque.

7. The method of claim 1, wherein:

the drive motor includes an internal combustion engine; and a point in time for an ignition of a fuel-air mixture present in a combustion chamber of the internal combustion engine is employed as the intervention variable to influence the torque.

8. The method of claim 1, wherein:

the drive motor includes an internal combustion engine, and an angle of a throttle valve of the internal combustion engine is employed as the intervention variable to influence the torque.

9. The method of claim 1, wherein:

the drive motor includes an electric motor, and one of a current and a voltage is employed the intervention variable to influence the torque.

10. A method for influencing a propulsive power of a motor vehicle driven by a drive motor, comprising the steps of:

ascertaining an intervention variable as a function of at least one of at least one wheel variable that describes a wheel behavior of at least one wheel of the motor vehicle and at least one vehicle motion variable that describes a motion of the motor vehicle, the intervention variable influencing a torque of the drive motor, to limit the propulsive power of the motor vehicle;

ascertaining a limitation variable that describes a number of limitations of driver stipulations resulting from ascertaining the intervention variable during a definable time window;

correcting the intervention variable as a function of the limitation variable toward a corresponding greater propulsive power if the limitation variable exceeds a definable first threshold value; and acting upon the drive motor with the corrected intervention variable.

11. The method of claim 10, wherein:

the drive motor includes an internal combustion engine; and a fuel quantity to be injected into one of an intake manifold and a combustion chamber of the internal combustion engine is employed as the intervention variable to influence the torque.

12. The method of claim 10, wherein:

the drive motor includes an internal combustion engine, and a point in time for an injection of a fuel into one of an intake manifold and a combustion chamber of the internal combustion engine is employed as the intervention variable to influence the torque.

13. The method of claim 10, wherein:

the drive motor includes an internal combustion engine, and a point in time for an ignition of a fuel-air mixture present in a combustion chamber of the internal combustion engine is employed as the intervention variable to influence the torque.

14. The method of claim 10, wherein:

the drive motor includes an internal combustion engine, and an angle of a throttle valve of the internal combustion engine is employed as the intervention variable to influence the torque.

15. The method of claim 10, wherein:

the drive motor includes an electric motor, and one of a current and a voltage is employed the intervention variable to influence the torque.

16. A control device for an apparatus for influencing a propulsive power of a motor vehicle driven by a drive motor, comprising:

a structure including at least one of:
  an arrangement for determining at least one wheel variable that describes a wheel behavior of at least one wheel of the motor vehicle, and
  an arrangement for determining at least one vehicle motion variable that describes a motion of the motor vehicle;

an arrangement for determining an intervention variable for influencing a torque of the drive motor as a function of at least one of the at least one wheel variable and the at least one vehicle motion variable, the drive motor being acted upon with the intervention variable to limit the propulsive power of the motor vehicle, an arrangement for ascertaining a pedal variable, the pedal variable describing an actuation of an accelerator pedal of the motor vehicle;

an arrangement for comparing a first propulsive power corresponding to the pedal variable to a second propulsive power corresponding to the intervention variable;

an arrangement for correcting the intervention variable as a function of the pedal variable toward a corresponding greater propulsive power if the first propulsive power is greater than the second propulsive power;

an arrangement for ascertaining a correction variable for correction of the intervention variable as a function of the pedal variable and a rotation speed of the drive motor;

an arrangement for adding the correction variable to the intervention variable to calculate a corrected intervention variable; and an arrangement for acting upon the drive motor with the corrected intervention variable.

17. A control device for an apparatus for influencing the actual propulsive power of a motor vehicle driven by a drive motor, comprising:

a structure including at least one of:
  an arrangement for determining at least one wheel variable that describes a wheel behavior of at least one wheel of the motor vehicle, and
  an arrangement for determining at least one vehicle motion variable that describes a motion of the motor vehicle;

an arrangement for determining an intervention variable for influencing a torque of the drive motor as a function of at least one of the at least one wheel variable and the at least one vehicle motion variable, the drive motor being acted upon with the intervention variable to limit the propulsive power of the motor vehicle;

an arrangement for ascertaining a limitation variable that describes a number of limitations of driver stipulations resulting from ascertaining the intervention variable during a definable time window;

an arrangement for correcting the intervention variable as a function of the limitation variable toward a corresponding greater propulsive power if the limitation variable exceeds a definable first threshold value; and an arrangement for acting upon the drive motor with the corrected intervention variable.

18. A memory element for a control device of an apparatus for influencing a propulsive power of a motor vehicle and in which is stored a computer program that is executable on a computing device, the computer program causing the computing device to perform the steps of:

ascertaining an intervention variable as a function of at least one of at least one wheel variable that describes a wheel behavior of at least one wheel of the motor vehicle and at least one vehicle motion variable that describes a motion of the motor vehicle, the intervention variable influencing a torque of the drive motor, to limit the propulsive power of the motor vehicle;

ascertaining a pedal variable that describes an actuation of an accelerator pedal of the motor vehicle;

comparing a first propulsive power corresponding to the pedal variable to a second propulsive power corresponding to the intervention variable;

correcting the intervention variable as a function of the pedal variable toward a corresponding greater propulsive power if the first propusive power is greater than the second propulsive power;

ascertaining a correction variable for correction of the intervention variable as a function of the pedal variable and a rotation speed of the drive motor, adding the correction variable to the intervention variable to calculate a corrected intervention variable; and acting upon the drive motor with the corrected intervention variable.

19. The memory element of claim 18, wherein the memory element includes one of a read-only memory, a random access memory, and a flash memory.

20. The memory element of claim 18, wherein the computing device is a microprocessor.

21. A memory element for a control device of an apparatus for influencing a propulsive power of a motor vehicle and in which is stored a computer program that is executable on a computing device, the computer program causing the computing device to perform the steps of:

ascertaining an intervention variable as a function of at least one of at least one wheel variable that describes a wheel behavior of at least one wheel of the motor vehicle and at least one vehicle motion variable that describes a motion of the motor vehicle, the intervention variable influencing a torque of the drive motor, to limit the propulsive power of the motor vehicle;

ascertaining a limitation variable that describes a number of limitations of driver stipulations resulting from ascertaining the intervention variable during a definable time window;

correcting the intervention variable as a function of the limitation variable toward a corresponding greater propulsive power if the limitation variable exceeds a definable first threshold value; and acting upon the drive motor with the corrected intervention variable.

22. The memory element of claim 21, wherein the memory element includes one of a read-only memory, a random access memory, and a flash memory.

23. The memory element of claim 21, wherein the computing device is a microprocessor.

* * * * *